June 10, 1969     N. O. ROSAEN     3,448,751
MAGNETIC FLUID PRESSURE CONTROL
Filed Oct. 8, 1965
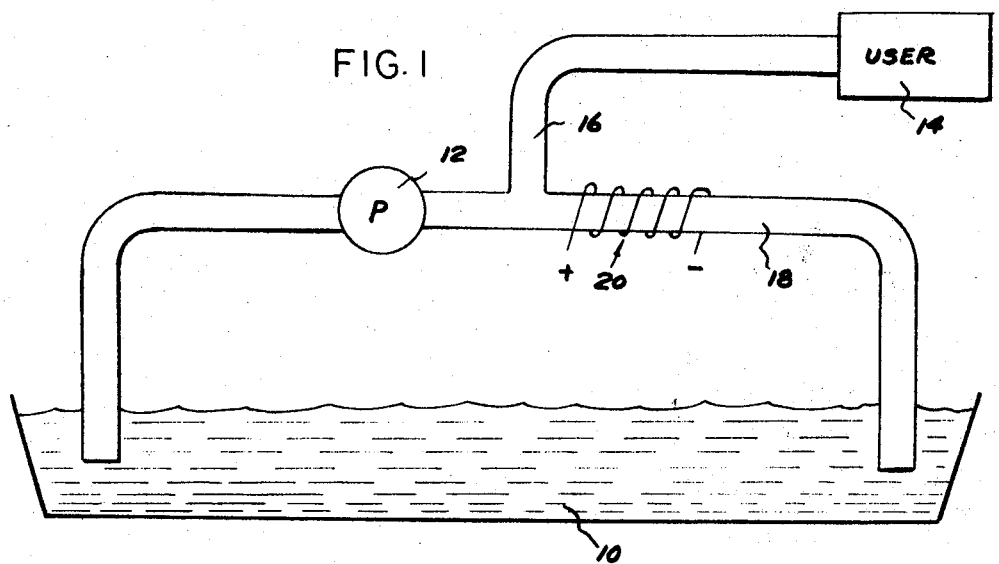
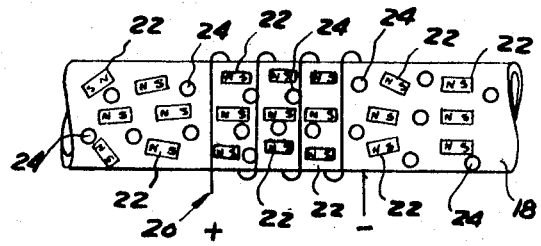
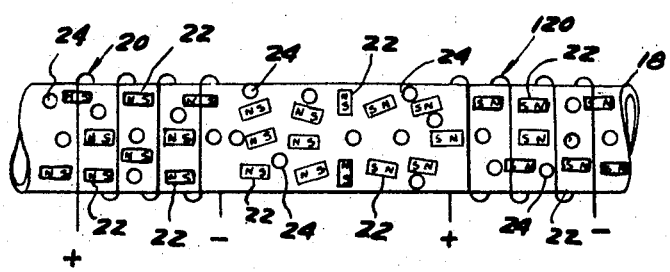
INVENTOR
NILS O. ROSAEN
BY    *Hanke & Hanke*
ATTORNEYS

United States Patent Office 3,448,751
Patented June 10, 1969

3,448,751
MAGNETIC FLUID PRESSURE CONTROL
Nils O. Rosaen, Bloomfield Hills, Mich., assignor to Norco Products Incorporated, Detroit, Mich., a corporation of Michigan
Filed Oct. 8, 1965, Ser. No. 494,162
Int. Cl. F15c *1/04;* F16k *9/00*
U.S. Cl. 137—81.5                12 Claims

ABSTRACT OF THE DISCLOSURE

A fluid system including a fluid having magnetic particles and diamagnetic particles and means for selectively producing a magnetic field within a portion of a conduit carrying the fluid to thereby regulate fluid flow therethrough.

---

The present invention relates to fluid systems, particularly to those fluid systems in which the user requires that the fluid pressure be regulated or varied, and more particularly to a new means for controlling fluid pressure within such systems.

In those fluid systems wherein the fluid user is actuated by providing pressurized fluid to and exhausting fluid from the user or wherein it is necessary to vary the pressure of the fluid delivered to the user the pressure has heretofore been controlled and regulated by a combination of valves and mechanical pressure regulating means.

The present invention provides a new and simple means for controlling the pressure of fluid delivered to a fluid user. Patent No. 3,163,785, issued to me on Dec. 29, 1964, discloses and claims a new fluid for fluid systems which comprises a heterogeneous mixture of magnetic particles and diamagnetic particles carried in a fluid medium. The fluid as disclosed in the aforementioned patent was intended for use primarily as a means of generating electric current. The present invention contemplates the use of such fluid in combination with one or more electromagnetic coils in a manner which will be described in greater detail below to provide a new means for controlling fluid pressure within a fluid system.

It is an object then of the present invention to improve fluid systems by providing a new means for controlling the fluid pressure within such systems.

It is another object of the present invention to provide a new means for controlling fluid pressure within a fluid system by providing a fluid for such systems comprising magnetic and diamagnetic particles carried within the fluid, means directing the fluid through a magnetic field to produce a resistance to fluid flow and means for controlling the magnetic force within the magnetic field to thereby control the fluid pressure upstream of the magnetic field.

Still further objects and advantages of the present invention will be readily apparent to one skilled in the art to which the invention pertains upon reference to the following description of several preferred embodiments of the invention. The description makes reference to the accompanying drawings in which like reference characters refer to like parts throughout the several views and in which:

FIG. 1 is a diagrammatic illustration of a fluid system embodying the present invention.

FIG. 2 is a view illustrating diagrammatically a portion of the system shown in FIG. 1 and enlarged somewhat for purposes of clarity.

FIG. 3 is a view similar to FIG. 2 but illustrating a preferred modification of the present invention.

Now referring to the drawings for a more detailed description of the present invention, FIG. 1 illustrates diagrammatically a preferred fluid system as comprising a fluid reservoir 10, a pump 12 and a fluid user 14 connected by conduit 16. A bypass conduit 18 is connected to the conduit 16 intermediate the exhaust side of the pump 12 and the user 14 and discharges to the reservoir 10. An electromagnetic coil indicated diagrammatically at 20 encompasses a portion of the conduit 18.

The fluid for the system is like that disclosed in my aforementioned patent and therefore comprises a heterogeneous mixture of magnetic particles 22 and diamagnetic particles 24, indicated diagrammatically in FIGS. 2 and 3 respectively as elongated bodies and round bodies inside the conduits 16 and 18, carried in a fluid medium to give mobility. The term "magnetic particles" is intended for the purposes of this disclosure to mean particles of a substance which has the characteristic that the particles will become polarized in the presence of a magnetic field and are attracted to the source of the magnetic field. By the term "diamagnetic particles" it is meant particles of a substance which has the characteristic of being repelled by the source of a magnetic field.

The magnetic particles 22 may be of the group of metals including iron or such iron alloys as $Fe_2Co$, preferably very finely powdered and having a density of about 6 to 8 at 20° C. The diamagnetic particles 24 may be of that group of metals including bismuth, also finely powdered and preferably having a greater density than the magnetic particle; bismuth's density, for example, being 9.8 at 20° C.

The fluid medium or carrier may be diethylene glycol, ethylene glycol, or a mixture of the two with corrosion inhibitor and distilled water if needed, having characteristics such that it is not affected by extremes of temperature, protects against rust and corrosion, and will not affect the stabiliy of the two carried elements. Yet such a carrier will provide the composite with fluidity enabling it to be poured, so that it will flow readily and be capable of being pumped through the fluid circuit.

The fluid system is arranged such that the pressure of the fluid delivered to the user 14 will depend upon the pressure being produced by the pump 12 and the fluid permitted to return to the reservoir 10 through the bypass conduit 18. Thus with fluid flow completely prevented through the bypass conduit 18 fluid would be delivered to the fluid user 14 at substantially pump pressure. Pressure regulation can be achieved by varying the restriction of flow through the bypass conduit 18.

In the present invention this pressure regulation is produced by the electromagnetic coil 20 and the effect actuation of the coil 20 has on the fluid used within the system. Energization of the coil 20 produces a magnetic field through which the fluid must pass to return to the reservoir. Assuming that the conduit 18 is of a magnetic material, the energized coil 20 will magnetize the conduit 18 to produce a magnet having its north pole at the left end of the coil 20 in FIG. 2 and its south pole at the right end. The influence of the magnetic field as can best be seen in FIG. 2 molecular orientation as indicated diagrammatically of the magnetic particles 22 being directed through the bypass conduit 18. The poles of the magnetic particles 22 tend to be attracted to the like poles of the conduit 18 and the diamagnetic particles 24 tend to move away from the areas of the most intense flux. This movement and the rotation of the magnetic particles as they move to become aligned as illustrated, as well as the tendency of the magnetic particles 22 to remain within the field, tends to disrupt axial flow through the conduit 18 and thus produces in effect a restriction to such flow which with other factors being equal, will depend upon the intensity of the magnetic field produced by the electromagnetic coil 20. By controlling the electromagnetic coil 20, the pressure of the fluid delivered to the user 14 can be effectively regulated and controlled.

It is apparent that by providing the diamagnetic particles 24 of a greater density than the magnetic particles 22, the magnetic particles 22 are effectively prevented from collecting along the wall of the conduit 18. This, while it produces a more efficient system, is not necessary and the diamagnetic particles 22 could be made of a material having a lesser density than the magnetic particles 22 and could even be eliminated altogether without seriously affecting the pressure regulating means of the present invention.

FIG. 3 illustrates diagrammatically the effect produced when another electromagnetic coil, 120 having its poles reversed, is provided, encompassing the bypass conduit 18 downstream of the coil 20. As illustrated diagrammatically, the movement of the magnetic particles 22 and the diamagnetic particles within the space intermediate the coils 20 and 120 would produce such a turbulence as to almost completely restrict fluid flow through the conduit 18. Thus, by providing a plurality of axially spaced coils an even finer regulation of fluid pressure to the user 14 can be achieved.

It is apparent that a similar effect can be achieved by constructing the conduit 18 in the area of the coil 20 of the nonmagnetic material such as copper. If this were done, the turns in the coil themselves would produce magnetic fields which would cause collection and orientation of the magnetic particles 22 and would therefore restrict flow to produce a build-up of pressure. Such a construction would have the advantage that deenergization of the coil 20 would produce an immediate resumption of fluid flow through the conduit 18 since there would be no residual magnetism in the conduit 18 to interfere with such flow.

It is also apparent that a novel means has been disclosed for achieving pressure regulation within a fluid system. Unlike other heretofore known pressure regulation means the present invention requires no valves or other mechanical pressure regulation means, and provides a system in which a fine regulation of pressure can be achieved.

It is further apparent that although I have described but two embodiments of my invention, many other changes and modifications can be made without departing from the spirit of the invention as expressed by the appended claims.

I claim:

1. A pressure regulating means for fluid systems, said means comprising:
   (a) a conduit and means directing a fluid through said conduit,
   (b) means for producing a magnetic field within a portion of said conduit,
   (c) said fluid having first particles polarized and attracted by said magnetic field producing means and second particles repelled by said magnetic field producing means whereby upon actuation of said magnetic field producing means fluid flow through said conduit is disturbed to produce an increase in the pressure of said fluid upstream of said magnetic field producing means.

2. In a fluid system having a reservoir, a user, means directing fluid from said reservoir to said user, and a conduit connecting said reservoir and bypassing said user, means regulating pressure to said user comprising:
   (a) means for producing a magnetic field within a portion of said conduit,
   (b) said fluid having first particles polarized and attracted by said magnetic field producing means and second particles repelled by said magnetic field producing means whereby upon actuation of said magnetic field producing means fluid flow through said conduit is disturbed to produce an increase in pressure of the fluid to said user.

3. In a fluid system having a reservoir, a user, means directing fluid from said reservoir to said user, and a conduit connected with said reservoir and bypassing said user, means for regulating pressure to said user comprising:
   (a) means for producing a first magnetic field within a portion of said conduit, and means for producing a second magnetic field within a portion of said conduit spaced from said first magnetic field producing means, and
   (b) said fluid having particles repelled by said first and second magnetic field producing means whereby upon actuation of said magnetic field producing means fluid flow through said conduit is disturbed intermediate said magnetic field producing means to produce an increase in the pressure of the fluid delivered to said user.

4. A pressure regulating means for fluid systems, said means comprising:
   (a) a conduit and means directing a fluid through said conduit,
   (b) a first means for producing a magnetic field within a portion of said conduit and a second means for producing a magnetic field within a portion of said conduit disposed downstream from said first magnetic field producing means,
   (c) said fluid having particles repelled by said first and second magnetic field producing means whereby upon actuation of said magnetic field producing means fluid flow through said conduit is disturbed intermediate said magnetic field producing means to produce an increase in the pressure of the fluid delivered to said user.

5. In a fluid system having a reservoir, a user, means directing fluid from said reservoir and bypassing said user, means regulating pressure to said user comprising:
   (a) means for producing a magnetic field within a portion of said conduit and means for producing a second magnetic field within a portion of said conduit, and
   (b) said fluid having first particles polarized and attracted by said magnetic field producing means and second particles repelled by said magnetic field producing means whereby upon actuation of said magnetic field producing means fluid flow through said conduit is disturbed intermediate said magnetic field producing means to produce an increase in the pressure of the fluid delivered to said user.

6. The pressure regulating means as defined in claim 1 and in which said magnetic field producing means comprises an electromagnetic coil.

7. The pressure regulating means as defined in claim 6 and in which said portion of said conduit is constructed of a magnetic material.

8. The pressure regulating means as defined in claim 6 and in which said portion of said conduit is constructed of a nonmagnetic material.

9. The system as defined in claim 2 and in which said second particles have a density greater than said first mentioned particles.

10. The system as defined in claim 2 and in which said magnetic field producing means comprises electromagnetic coil.

11. The system as defined in claim 10 and in which said portion of said conduit is constructed of a magnetic material.

12. The system as defined in claim 10 and in which said portion of said conduit is constructed of a nonmagnetic material.

References Cited

UNITED STATES PATENTS

| | | |
|---|---|---|
| 2,661,596 | 12/1953 | Winslow. |
| 3,010,471 | 11/1961 | Gross. |
| 3,163,785 | 12/1964 | Rosaen _____ 310—12 |
| 2,698,127 | 12/1954 | Bowlus. |

ALAN COHAN, *Primary Examiner.*

D. H. LAMBERT, *Assistant Examiner.*

U.S. Cl. X.R.

103—1; 137—82, 251